(12) United States Patent
Yamamoto et al.

(10) Patent No.: US 7,901,317 B2
(45) Date of Patent: Mar. 8, 2011

(54) REDUCTION GEAR

(75) Inventors: Akira Yamamoto, Obu (JP); Mitsuhiro Tamura, Obu (JP); Yoshitaka Shizu, Obu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/843,496

(22) Filed: Jul. 26, 2010

(65) Prior Publication Data
US 2010/0292040 A1 Nov. 18, 2010

Related U.S. Application Data

(63) Continuation of application No. PCT/JP2009/052199, filed on Feb. 10, 2009.

(30) Foreign Application Priority Data

Feb. 19, 2008 (JP) ................................ 2008-037120

(51) Int. Cl.
*F16H 1/32* (2006.01)
(52) U.S. Cl. ...................................................... 475/168
(58) Field of Classification Search ........................ None
See application file for complete search history.

(56) References Cited

U.S. PATENT DOCUMENTS

| 4,604,916 | A  | * | 8/1986 | Distin, Jr. ....................... 475/168 |
| 5,989,144 | A  | * | 11/1999 | Chen et al. ..................... 475/168 |
| 7,361,119 | B2 | * | 4/2008 | Tanaka et al. .................. 475/348 |
| 7,553,249 | B2 | * | 6/2009 | Nohara .......................... 475/170 |

FOREIGN PATENT DOCUMENTS

| JP | 4-80951 | 7/1992 |
| JP | 2001-187945 | 7/2001 |
| JP | 2003-021198 | 1/2003 |
| JP | 2004-084948 | 3/2004 |
| JP | 2007-285396 | 11/2007 |

* cited by examiner

*Primary Examiner* — Dirk Wright

(74) *Attorney, Agent, or Firm* — Squire, Sanders & Dempsey (US) LLP

(57) ABSTRACT

The reduction gear includes a plurality of first and second rollers that are disposed so as to directly come into rolling contact with the outer peripheries of first and second eccentric bodies; first and second retainers that maintain gaps between the first and second rollers in the circumferential direction of the first and second eccentric bodies; and first and second guide bodies of which the movement in the axial direction is restricted and which restrict the movement of the first and second rollers in the axial direction by coming into direct contact with ends of the first and second rollers.

5 Claims, 6 Drawing Sheets

REDUCTION GEAR

CROSS-REFERENCE RELATED APPLICATION

This is a continuation application of International Application No. PCT/JP2009/052199, filed Feb. 10, 2009, which claims priority of Japanese Patent Application No. 2008-37120, filed on Feb. 19, 2008. The disclosure of these prior applications are hereby incorporated by reference herein in their entirety.

BACKGROUND OF THE INVENTION

1. Field of the Invention

The present invention relates to a reduction gear, and more particularly, to a reduction gear that is suitable for a device for driving a joint of an industrial robot.

2. Description of the Related Art

A reduction gear shown in FIG. 6 is disclosed in, for example, in JP-A-2007-285396. The reduction gear 10 includes an input shaft 12, first and second eccentric bodies 14 and 16, first and second externally toothed gears 18 and 20, an internally toothed gear 22, and first and second support flanges 24 and 26 as output members.

The first and second eccentric bodies 14 and 16 have outer peripheries that are eccentric to (not coaxial with) an axis Oi of the input shaft 12, and are formed integrally with the input shaft 12. The eccentric phases of the first and second eccentric bodies 14 and 16 are deviated from each other by 180°. First and second externally toothed gears 18 and 20 are assembled on the outer peripheries of the first and second eccentric bodies 14 and 16.

First and second inner pinholes 40 and 42 are formed at the first and second externally toothed gears 18 and 20. An inner pin 44 and an inner roller 43 penetrate the inner pinholes 40 and 42, and can transmit the rotational components of the first and second externally toothed gears 18 and 20 to first and second support flange.

When the input shaft 12 is rotated by a motor (not shown), the first and second eccentric bodies 14 and 16 are eccentrically rotated together with the input shaft 12 as a single body. Accordingly, if the input shaft 12 is rotated one revolution, the externally toothed gears 18 and 20 assembled on the outer peripheries of the first and second eccentric bodies 14 and 16 oscillate in one time. As a result, the first and second externally toothed gears 18 and 20 are rotated relative to the internally toothed gear 22, which is stopped, by an angle corresponding to the difference in the number of teeth of the first and second externally toothed gears and the internally toothed gear 22. This relative rotation is taken out from any one of the first and second support flanges 24 and 26 through the inner roller 43 and the inner pin 44 as a speed reduction output.

Rollers 34N and 36N without inner and outer rings (or using the first and second eccentric bodies 14 and 16 as inner rings and using the first and second externally toothed gears 18 and 20 as outer rings) are interposed between the outer peripheries of the first and second eccentric bodies 14 and 16 and the first and second externally toothed gears 18 and 20. Further, the input shaft 12 is also supported by rollers 38N and 39N having the same specifications.

The rollers 34N, 36N, 38N, and 39N are fitted to pockets (not shown) with claws of retainers 42, 44, 46, and 48, respectively, so that gaps in a circumferential direction are maintained and the movement of the rollers relative to the retainers 42, 44, 46, and 48 in the axial direction is restricted.

The movement of the retainers 42, 44, 46, and 48 in the axial direction is restricted by thrust washers 60 and 62. Since the movement of the retainers 42, 44, 46, and 48 in the axial direction is restricted by the thrust washers 60 and 62, gaps between the rollers 34N, 36N, 38N, and 39N, which are held in the pockets of the retainers 42, 44, 46, and 48, are maintained in the circumferential direction and the movement of the rollers in the axial direction is restricted at the same time.

SUMMARY OF THE INVENTION

According to an embodiment of the invention, there is provided a reduction gear that includes an externally toothed gear and an internally toothed gear and makes the externally toothed gear mesh with an inner portion of the internally toothed gear by using a tubular body. The tubular body is provided on an input shaft and has an outer periphery that is not coaxial with an axis of the input shaft. The reduction gear includes a plurality of rollers that directly comes into rolling contact with the outer periphery of the tubular body; a retainer that maintains gaps between the plurality of rollers in a circumferential direction of the tubular body; and a guide body of which the movement is restricted in an axial direction and which restrict the movement of the rollers in the axial direction by coming into direct contact with ends of the rollers in the axial direction.

DETAILED DESCRIPTION OF THE INVENTION

In the related art, the position of a "roller", which is a rolling body of a bearing, has been restricted by retainers that maintain gaps between the rollers in a circumferential direction and restrict the movement of the rollers in the axial direction. However, a reduction gear short in the axial direction is required as a reduction gear that is used for a device for driving a joint of, for example, an industrial robot. If, for example, the thrust washers are disposed to restrict the movement of the retainer in the axial direction like in the related art, the axial length of the reduction gear is increased due to the thrust washers.

It is desired to provide a reduction gear of which the axial length may be further reduced.

According to an embodiment of the present invention, the plurality of rollers directly comes into rolling contact with the outer periphery of the tubular body. Accordingly, it may be possible to assemble as large rolling bodies (rollers) as possible (in the same bearing space).

Here, in the related art, gaps of a "roller group" in the circumferential direction have been maintained and the movement of the roller group in the axial direction has been restricted by the retainers that collectively hold rollers. However, in the embodiment of the present invention, the gaps in the circumferential direction are maintained by the retainers, but the movement in the axial direction is restricted by making the guide bodies come into direct contact with the "ends of the rollers" in the axial direction.

As a result, as apparent from the embodiment to be described below, it may be possible to dispose the members (the thrust washers in the related art), which have been disposed to further restrict the movement of the retainers from the ends of the retainers in the axial direction, at positions that overlap the retainers in the axial direction. Accordingly, it may be possible to reduce the axial length of the reduction gear by that much.

Further, it may be possible to further reduce the thermal loads on the retainers. This advantage is particularly significant if the retainers are made of a resin.

According to the embodiment of the present invention, it may be possible to further reduce the axial length of the reduction gear in the axial direction.

An example of an embodiment of the invention will be described in detail below with reference to drawings.

Figure 4:
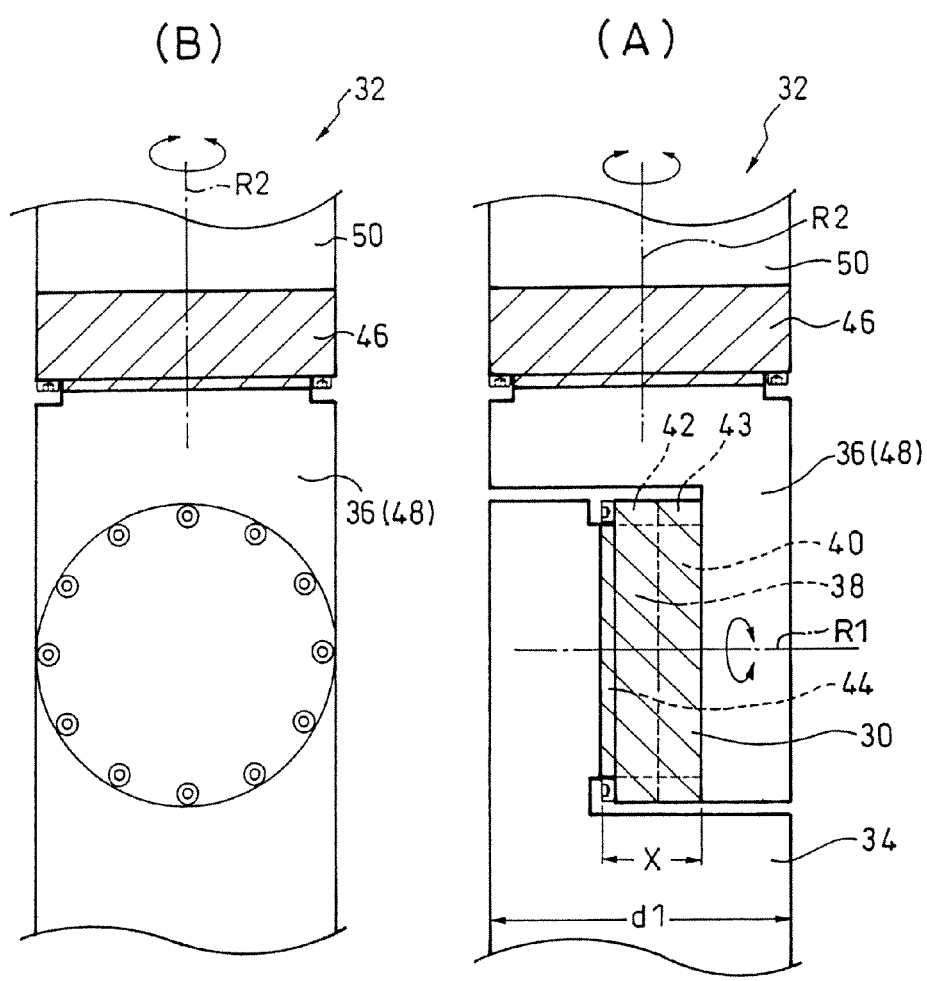
FIG. 4 is a schematic plan view showing that the joint driving device is applied to an arm of a robot.

FIG. 4 is a schematic plan view and a schematic side view showing that a reduction gear 38 according to an example of an embodiment of the invention is applied to a joint driving device of an arm of a robot.

The robot joint driving device 30 includes a reduction gear 38 and a flat motor 40, and drives first and second members 34 and 36 of an arm 32 of a robot (the entire robot is not shown) so that the first and second members are rotated relative to each other. The first member 34 is fixed to an output flange (output shaft: output member) 44 of the reduction gear 38. A reduction gear casing 42 is fixed to the second member 36 through a motor casing 43. The output flange 44 of the reduction gear 38 may be rotated relative to a reduction gear casing 42 about a rotational axis R1. Accordingly, the first member 34, which is fixed to the output flange 44 of the reduction gear 38, can be eventually rotated relative to the second member 36, to which the reduction gear casing 42 is fixed, about the rotational axis R1. Meanwhile, if a robot joint driving device 46, which has exactly the same structure as the robot joint driving device 30, is disposed at a position where the second member 36 is regarded as a first member 48 and a member denoted by reference numeral 50 is regarded as a second member, the robot joint driving device 30 can be applied as a robot joint driving device for driving the first and second members 48 and 50 so that the first and second members are rotated relative to each other about a rotational axis R2.

Figure 1:
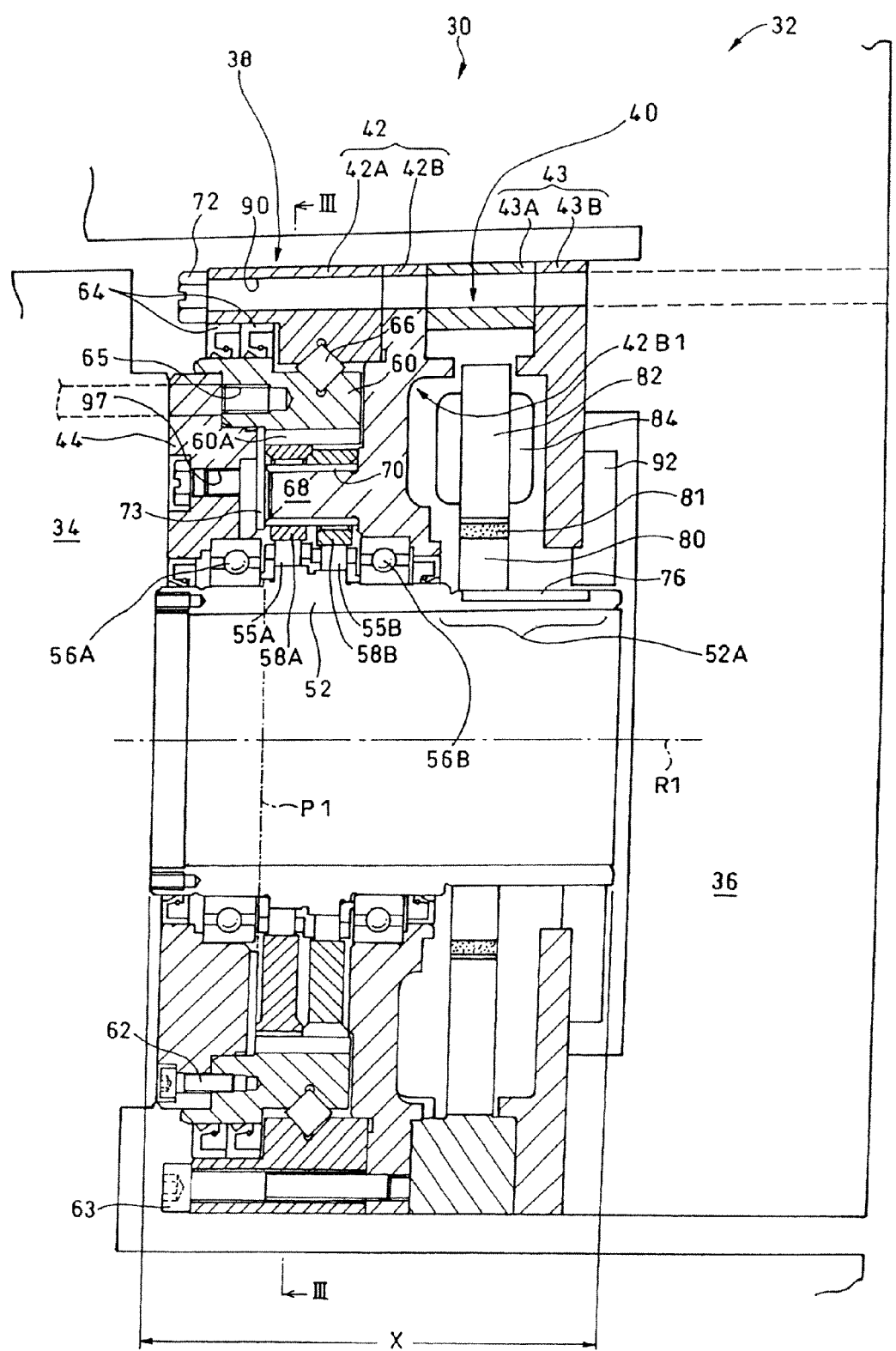
FIG. 1 is a cross-sectional view of a robot joint driving device to which a reduction gear according to an example of an embodiment of the invention is applied.
Figure 2:
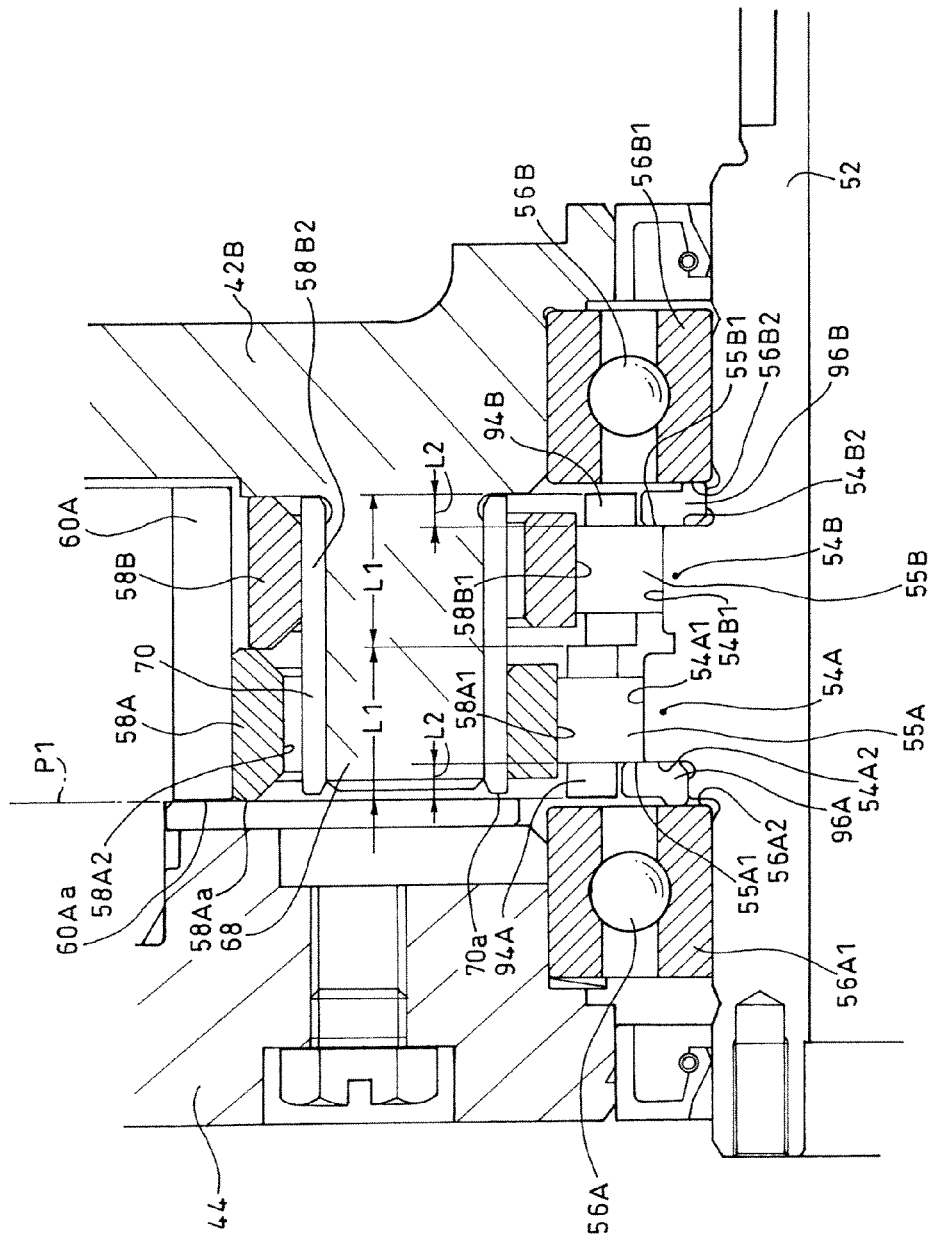
FIG. 2 is an enlarged view of main parts of FIG. 1.
Figure 3:
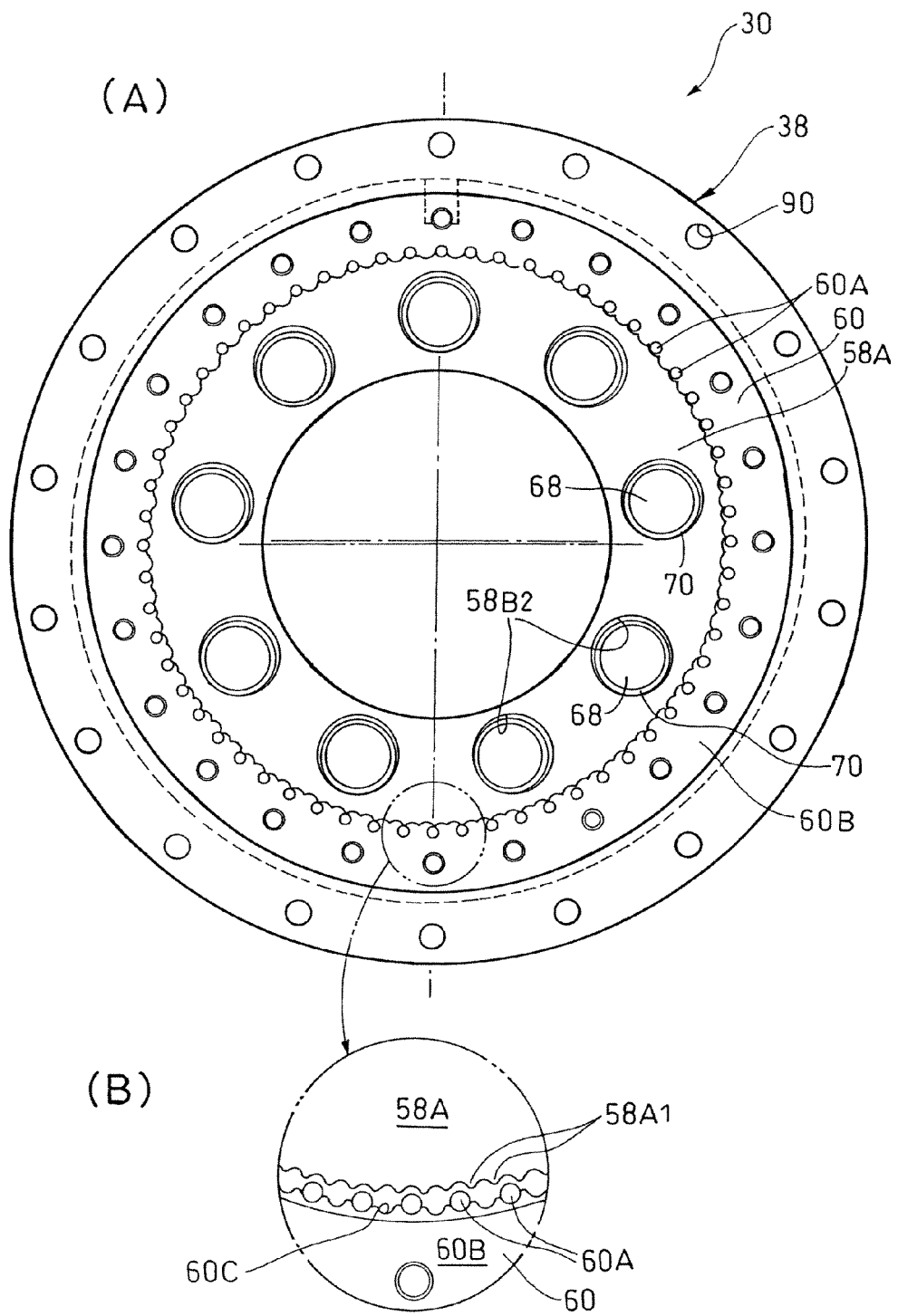
FIG. 3 is a (reduced) cross-sectional view taken along a line III-III of FIG. 1.

FIG. 1 is an entire cross-sectional view of the vicinity of the reduction gear 38 and the flat motor 40 of the robot joint driving device 30, FIG. 2 is an enlarged view of main parts of FIG. 1, and FIG. 3 is a (reduced) cross-sectional view taken along a line III-III of FIG. 1.

The reduction gear casing 42 of the reduction gear 38 includes first and second reduction gear casing bodies 42A and 42B. The reduction gear 38 according to this embodiment is an eccentrically oscillating reduction gear that includes first and second externally toothed gears 58A and 58B and an internally toothed gear 60 and makes the first and second externally toothed gears 58A and 58B mesh with an inner portion of the internally toothed gear 60 by using the first and second eccentric bodies (tubular bodies) 54A and 54B. The reduction gear will be described in detail below.

An input shaft 52 is supported by a pair of first and second ball bearings 56A and 56B in the reduction gear casing 42. The input shaft 52 includes a cantilever protruding portion 52A, which protrudes from the reduction gear casing 42 (specifically, a second reduction gear casing body 42B of the reduction gear casing) like a cantilever, and a rotor 80 of the flat motor 40 is fixed to the cantilever protruding portion 52A by a key 76.

As shown in the enlarged view of FIG. 2, the first and second eccentric bodies (tubular bodies) 54A and 54B are formed integrally with a part of the outer periphery of the input shaft 52. The first and second eccentric bodies 54A and 54B includes outer peripheries, which are not coaxial with an axis (rotational axis) R1 of the input shaft 52, specifically, outer peripheries 54A1 and 54B1 that are eccentric to the axis of the input shaft by a predetermined distance. A plurality of first and second rollers 55A and 55B is disposed on the outer peripheries of the first and second eccentric bodies 54A and 54B so as to directly come into rolling contact with the outer peripheries of the first and second eccentric bodies. The structure for positioning the first and second rollers 55A and 55B will be described in detail below. The first and second externally toothed gears 58A and 58B are assembled on the outer peripheries of the first and second rollers 55A and 55B so as to freely oscillate and rotate. The respective first and second externally toothed gears 58A and 58B mesh with the inner portion of the internally toothed gear 60.

Inner teeth of the internally toothed gear 60 are formed of rotatable outer pins 60A. Although schematically shown in FIG. 3A, outer pin grooves 60C are formed on a main body 60B of the internally toothed gear 60 and the outer pins 60A are assembled into the outer pin grooves 60C in every other groove as shown in a partially enlarged view of FIG. 3B. The number of outer teeth 58A1 and 58B1 of each of the first and second externally toothed gears 58A and 58B (outer teeth 58A1 of only the first externally toothed gear 58A are shown in FIG. 3) is slightly smaller than the number of the outer pin grooves 60C (which corresponds to the number of actual inner teeth) (by 1 in the example shown in the drawing). It is preferable that the outer pins 60A be assembled into all the outer pin grooves 60C. However, in this example, the outer pins are assembled into only the half of the outer pin grooves for the reduction in costs and assembly man-hour.

The eccentric directions of the first and second externally toothed gears 58A and 58B are deviated from each other by 180° in a circumferential direction by the first and second eccentric bodies 54A and 54B. Accordingly, as the input shaft 52 rotates, the respective first and second externally toothed gears 58A and 58B may eccentrically oscillate while maintaining a phase difference of 180°.

Referring to FIG. 1 again, oil seals 64 and a cross roller 66 are disposed between the first reduction gear casing body 42A and the internally toothed gear 60 in the reduction gear 38. Further, an inner pin 68 integrally protrudes from the second reduction gear casing body 42B that is disposed adjacent to the first reduction gear casing body 42A. The inner pin 68 penetrates first and second inner pinholes 58A2 and 58B2 of the first and second externally toothed gears 58A and 58B, and restricts the rotation of the first and second externally toothed gears 58A and 58B. An inner roller 70 is mounted on the outer periphery of the inner pin 68. The inner roller 70 reduces sliding resistance between the inner pin 68 and the inner pinholes 58A2 and 58B2 of the first and second externally toothed gears 58A and 58B.

The output flange (output member) 44 is disposed on the side of the internally toothed gear 60 opposite to the flat motor. The output flange 44 is integrated with the internally toothed gear 60 by bolts 62, and are integrated with the internally toothed gear 60 together with the first member 34 of the robot by bolts (not shown) that are threadedly engaged with the bolt holes 65. That is, since being integrated with the output flange 44, the first member 34 may be rotated together with the output flange 44.

Moreover, in this embodiment, as shown in FIG. 2, an end face 60Aa of the outer pin 60A of the internally toothed gear 60 opposite to the flat motor, an end face 58Aa of the first externally toothed gear 58A opposite to the flat motor, and an end face 70a of the inner roller 70 opposite to the flat motor are disposed on substantially the same plane P1. Further, a planar slide plate 73 is disposed between the output flange 44 and these three end faces 60Aa, 58Aa, and 70a. The slide plate 73 simultaneously restricts the movement of the outer pin 60A, the first and second externally toothed gears 58A and 58B, and the inner roller 70 in the axial direction.

The reduction gear casing 42 and the motor casing 43 are fixed to the second member 36 of the arm 32 of the robot by a bolt 72 (FIG. 1), so that the reduction gear 38 and the flat motor 40 are connected to each other. Due to this structure, eventually, the reduction gear casing 42 is fixed to the second member 36 and the first member 34 fixed to the output flange 44 may be rotated relative to the second member 36 about the rotational axis R1.

The structure for positioning the first and second rollers 55A and 55B will be described in detail herein.

Referring to FIG. 2, the plurality of first and second rollers 55A and 55B is disposed on the outer peripheries 54A1 and 54B1 of the first and second eccentric bodies 54A and 54B so as to directly come into rolling contact with the outer peripheries of the first and second eccentric bodies. The first and second rollers 55A and 55B also come into direct contact with center holes 58A1 and 58B1 of the first and second externally toothed gears 58A and 58B, respectively. That is, the first and second rollers 55A and 55B are provided with neither so-called inner rings nor outer rings. From another viewpoint, it may be regarded that a large bearing mechanism is formed since the first and second eccentric bodies 54A and 54B function as inner rings and the first and second externally toothed gears 58A and 58B function as outer rings.

Reference numerals 94A and 94B in the drawing denote first and second retainers. Each of the first and second retainers 94A and 94B is formed in the shape of a ring having a width L1, and includes a pocket (not shown) with a claw. The first and second rollers 55A and 55B are received in the pockets of the first and second retainers 94A and 94B, respectively, so that gaps between the first and second rollers in the circumferential direction of the eccentric body are maintained and the positions of the first and second rollers relative to the first and second retainers 94A and 94B are defined in the axial direction. Further, reference numeral L2 in the drawing corresponds to the length of a portion of each of the first and second retainers 94A and 94B, which protrude more than the ends of the pockets of the first and second rollers 55A and 55B to the outside in the axial direction. In this embodiment, the first and second retainers 94A and 94B come into contact with each other in the axial direction.

Even in this embodiment, the gaps between the first and second rollers 55A and 55B in the circumferential direction are maintained by the first and second retainers 94A and 94B like in the related art. However, the movement of the first and second rollers 55A and 55B in the axial direction is restricted by making first and second guide bodies 96A and 96B come into direct contact with ends 55A1 and 55B1 of the first and second rollers 55A and 55B in the axial direction so that the holding functions of the first and second guide bodies and the first and second retainers 94A and 94B are combined with each other.

The first guide body 96A is formed of an independent single member. The first guide body is interposed between an end 56A2 of an inner ring 56A1 of the first ball bearing 56A in the axial direction and an end 54A2 of the first eccentric body 54A in the axial direction, so that the movement of the first guide body in the axial direction is restricted. Further, the second guide body 96B is also formed of an independent single member. The second guide body is interposed between an end 56B2 of an inner ring 56B1 of the second ball bearing 56B in the axial direction and an end 54B2 of the second eccentric body 54B in the axial direction, so that the movement of the second guide body in the axial direction is restricted. However, the first and second guide bodies 96A and 96B are fixed to neither the ends 54A2 and 54B2 of the first and second eccentric bodies 54A and 54B in the axial direction nor the ends 56A2 and 56B2 of the inner rings 56A1 and 56B1 of the first and second ball bearings 56A and 56B in the axial direction, and may slide on the ends of the first and second eccentric bodies and the ends of the inner rings of the first and second ball bearings. The first and second ball bearings 56A and 56B are positioned in the axial direction by the output flange 44 and the second reduction gear casing body 42B, respectively. Accordingly, the movement of the first and second rollers 55A and 55B is effectively restricted in the axial direction by the above-mentioned structure.

Referring to FIG. 1 again, the flat motor 40 is received in the motor casing 43. The motor casing 43 includes first and second motor casing bodies 43A and 43B. The flat motor 40 includes a coil end 84 and a stator 82 fixed to the first motor casing body 43A, in addition to a magnet 81 and the rotor 80 fixed to the input shaft 52. The first and second reduction gear casing bodies 42A and 42B of the reduction gear casing 42, the first and second motor casing bodies 43A and 43B of the motor casing 43, and the second member 36 of the arm 32 of the robot are integrated with each other by the bolt 72 as described above.

Among them, the second reduction gear casing body 42B functions as both a reduction gear front cover and a motor end cover. A recess 42B1, which can receive the coil end 84 when the flat motor 40 is connected, is formed on the side surface of the second reduction gear casing body 42B with which the flat motor 40 comes into contact so that the coil end 84 of the flat motor 40 occupies a large space in the axial direction.

Meanwhile, reference numeral 63 of FIG. 1 denotes a bolt that is used when a reduction gear is formed of a single body, reference numeral 90 denotes a through hole where a bolt 72 is inserted, and reference numeral 92 is an encoder that detects the rotation of the flat motor 40.

The operation of the robot joint driving device 30, particularly, the reduction gear 38 of the robot joint driving device will be described below.

When current is supplied to the flat motor 40 and the rotor 80 rotates, the input shaft 52 of the reduction gear 38 (which is also a motor shaft) is rotated through the key 76. When the input shaft 52 rotates, each of the first and second eccentric bodies 54A and 54B formed integrally with the input shaft 52 is rotated so as to have a phase difference of 180°. When the first and second eccentric bodies 54A and 54B rotate, the first and second externally toothed gears 58A and 58B eccentrically are rotated while having a phase difference of 180° in the circumferential direction.

The torque applied to the input shaft 52 in a radial direction is offset due to the existence of this phase difference. Accordingly, only the moment, which is generated due to the deviation of the position of a point of application of torque in the axial direction, is applied to the first and second ball bearings 56A and 56B.

The inner pin 68 penetrates the first and second inner pinholes 58A1 and 58B1 of the first and second externally toothed gears 58A and 58B, and the inner pin 68 is integrated with the second reduction gear casing body 42B. For this reason, the rotation of the first and second externally toothed gears 58A and 58B is restricted, so that the first and second externally toothed gears oscillate (without rotating). The meshing positions, where the internally toothed gear 60 meshes with the first and second externally toothed gears 58A and 58B, are sequentially deviated due to this oscillation. The number of teeth of the internally toothed gear 60 (which corresponds to the number of teeth of the outer pin groove 40C) is different from the number of teeth of each of the first and second externally toothed gears 58A and 58B by "1". Accordingly, whenever the meshing positions, where the internally toothed gear 60 meshes with the first and second externally toothed gears 58A and 58B, are sequentially deviated and make one revolution (whenever the input shaft 52 is rotated one revolution), the internally toothed gear 60 is rotated by an angle corresponding to the difference in the number of teeth of the first and second externally toothed gears 58A and 58B. As a result, eventually, if the input shaft 52 is rotated one revolution, the internally toothed gear 60 is rotated by an angle corresponding to 1/(the number of teeth of the internally toothed gear 60).

In this case, the rotation of the internally toothed gear 60 is supported through the cross roller 66 by the reduction gear casing 42. The rotation of the internally toothed gear 60 is transmitted to the output flange 44, which is integrated with the internally toothed gear 60 by the bolts 62 or the like, and is output as the rotation of the first member 34 of the arm 32 of the robot that is fixed to the output flange 44.

It may be possible to reduce the axial length X of the joint driving device 30 according to this embodiment by as much as a bearing or an oil seal is not provided on the flat motor 40, and to reduce the axial length X since the second reduction gear casing body 42B functions as both a so-called reduction gear cover and a motor end cover. Further, in this embodiment, it may be possible to further reduce the axial length X through the device for the positioning of the first and second rollers 55A and 55B.

The operation relating to the positioning of the first and second rollers 55A and 55B will be described here.

As described above, the first and second retainers 94A and 94B have a function to maintain gaps between the first and second rollers 55A and 55B in the circumferential direction of the eccentric body and a function to restrict the position of the first and second rollers 55A and 55B relative to themselves (the first and second retainers 94A and 94B) in the axial direction. For this reason, in the related art, the positions of the first and second retainers 94A and 94B have been restricted in the axial direction, so that gaps between the first and second rollers 55A and 55B in the circumferential direction of the eccentric body have been maintained and the movement of the first and second rollers in the axial direction has been restricted (the first and second rollers have been positioned in the axial direction).

However, in this embodiment, the movement of the first and second rollers 55A and 55B in the axial direction is restricted by making the first and second guide bodies 96A and 96B come into direct contact with the (respective one) ends 55A1 and 55B1 of (not the first and second retainers 94A and 94B but) the first and second rollers 55A and 55B in the axial direction so that the holding functions of the first and second guide bodies and the first and second retainers 94A and 94B are combined with each other. This skillfully uses the relationship between the first and second retainers 94A and 94B and the first and second rollers 55A and 55B.

In more detail, in this embodiment, the positioned of the first and second ball bearings 56A and 56B are defined in the axial direction by the output flange 44 and the second reduction gear casing body 42B.

The first guide body 96A, the first and second eccentric bodies 54A and 54B, and the second guide body 96B are assembled between the inner rings 56A1 and 56B1 of the first and second ball bearings 56A and 56B while coming into contact with each other. That is, the first guide body 96A is interposed between two members (the inner ring 56A1 of the first ball bearing 56A and the first eccentric body 54A), so that the movement of the first guide body in the axial direction is restricted. Further, the second guide body 96B is also interposed between two members (the inner ring 56B1 of the second ball bearing 56B and the second eccentric body 54B), so that the movement of the second guide body in the axial direction is restricted. As a result, the movement of one ends 55A1 and 55B1 of the first and second rollers 55A and 55B in the axial direction (separation direction) is restricted by the first and second guide bodies 96A and 96B.

Furthermore, the movement of the first and second rollers 55A and 55B and the first and second retainers 94A and 94B in the axial direction are restricted through pockets. As a result, it may be possible to maintain gaps between the first and second rollers 55A and 55B in the circumferential direction of the eccentric body and to restrict the movement of the first and second rollers in the axial direction by the pockets of the first and second retainers 94A and 94B at the same time.

As a result, in order to restrict the movement of the first and second retainers 94A and 94B in the axial direction, positioning members and the first and second retainers 94A and 94B are not disposed parallel to each other in the axial direction, and the positioning members (the first and second guide bodies 96A and 96B) may be disposed at positions (an area corresponding to the axial length denoted by reference numeral L2 of FIG. 2) where the first and second retainers 94A and 94B and a positioning member overlap each other in the axial direction. Accordingly, it may be possible to reduce the axial length X of the reduction gear 38 by that much.

Further, as described above, the first and second guide bodies 96A and 96B are formed of independent single members, are fixed to neither the first and second eccentric bodies 54A and 54B nor the inner rings 56A1 and 56B1 of the first and second ball bearings 56A and 56B, and may slide on the first and second eccentric bodies and the inner rings of the first and second ball bearings. As a result, the first and second guide bodies 96A and 96B come into contact with the first and second rollers 55A and 55B and thermal loads of the first and second retainers 94A and 94B are significantly reduced as compared to the related art. This advantage is particularly significant if the first and second retainers 94A and 94B are made of a resin.

An example of another embodiment of the invention will be described below.

In the above-mentioned embodiment, the guide bodies have been disposed between first and second ball bearings 56A and 56B and the first and second eccentric bodies 54A and 54B. However, in the invention, the positions of the guide bodies are not limited to this example, that is, the movement of the guide bodies may be restricted in the axial direction, and the guide bodies may restrict the movement of the rollers in the axial direction by coming into direct contact with the ends of the rollers in the axial direction.

Figure 5:
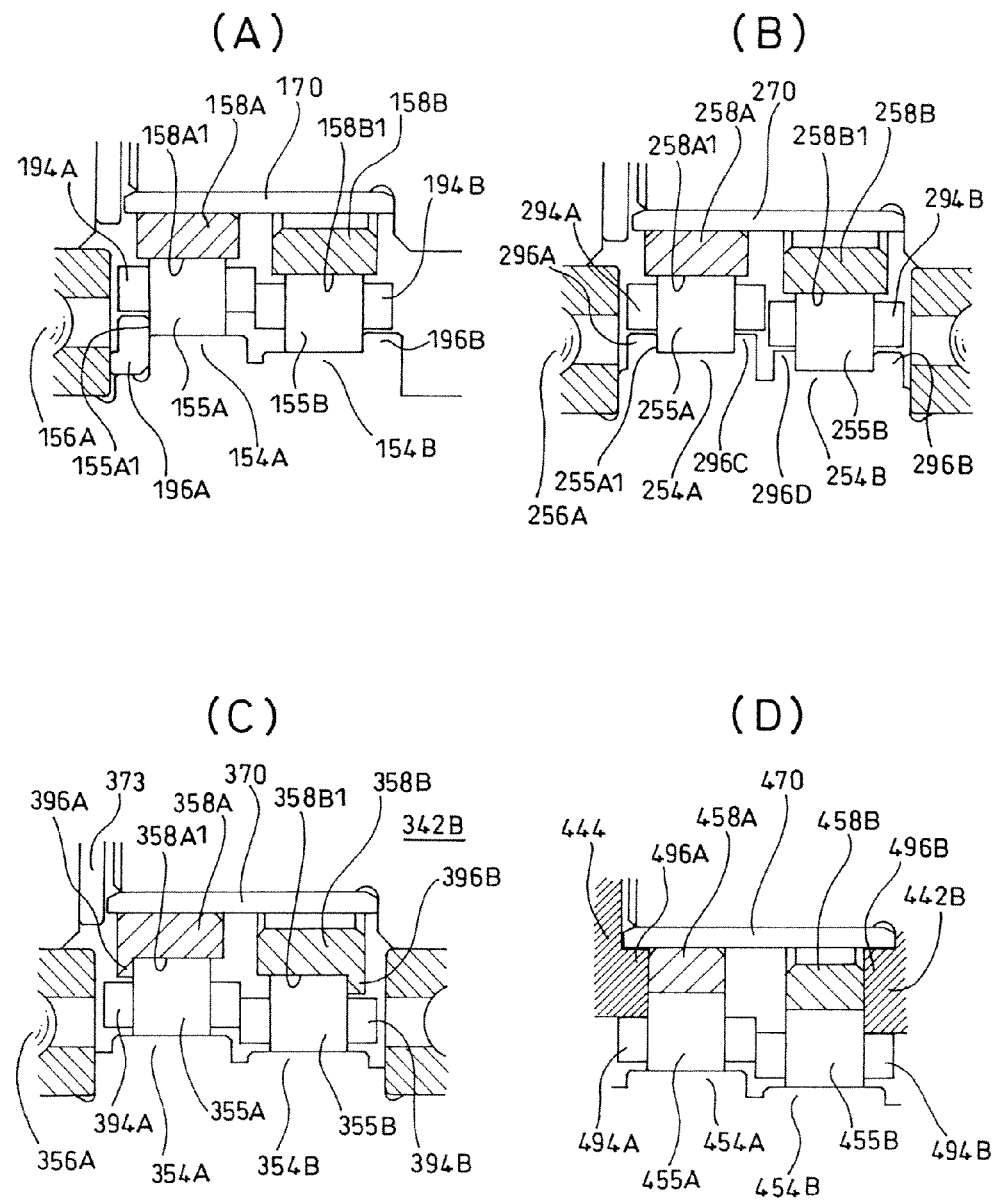
FIG. 5 is a partial cross-sectional view showing an example of another embodiment of the invention.
Figure 6:
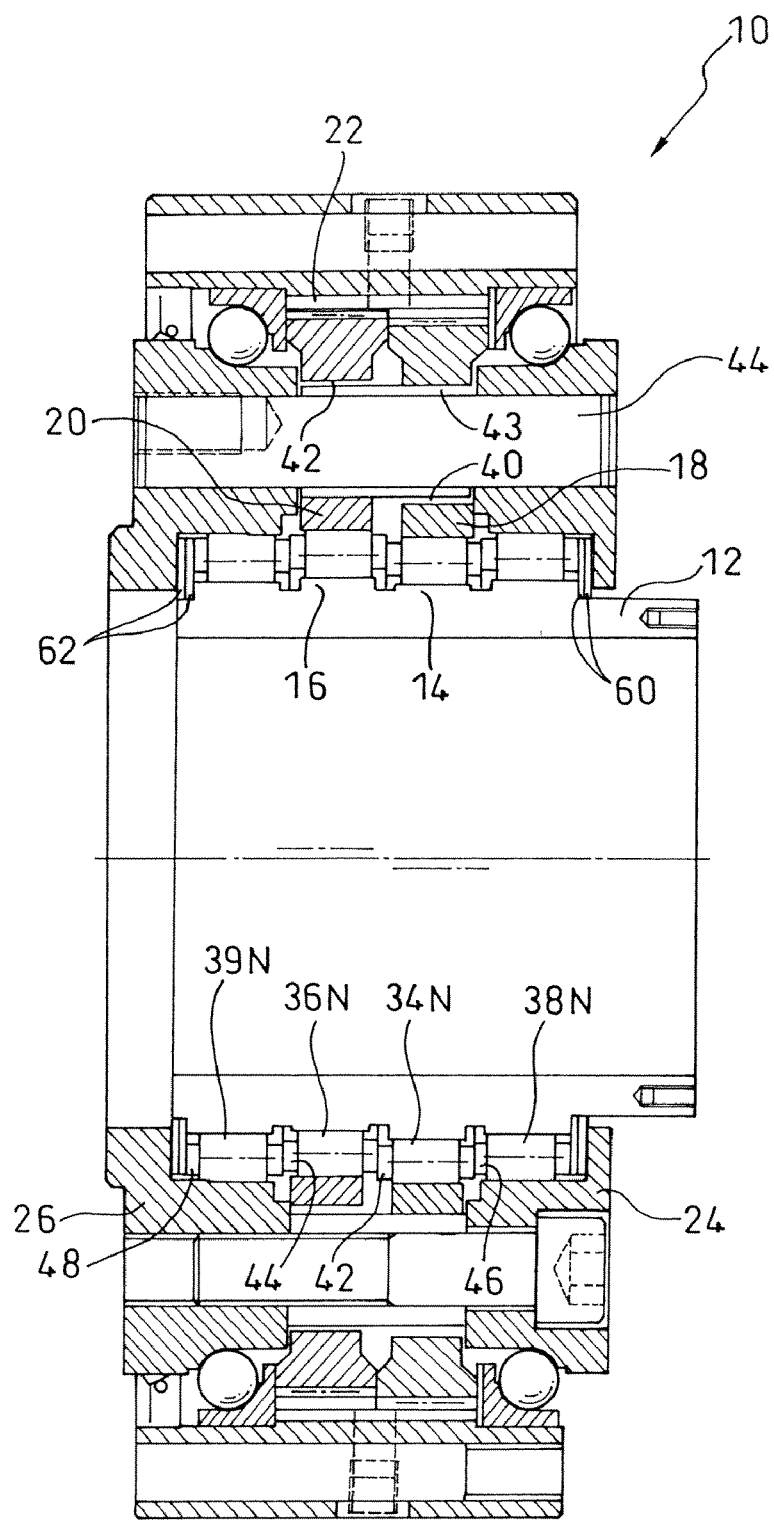
FIG. 6 is a cross-sectional view showing an example of a reduction gear in the related art.

For example, as shown in FIG. 5A, a second guide body 196B of the embodiment may be formed integrally with not an independent member but a second eccentric body 154B of which the movement in the axial direction is restricted.

When only one second guide body 196B of the first and second guide bodies 196A and 196B is formed integrally with another member (the second eccentric body 154B in this example) as described above, it may be possible to obtain an advantage of very easily assembling the first and second rollers 155A and 155B from the separate side (the side of the first guide body 194A in this example) in addition to an advantage of reducing the number of components by that much.

However, for example, as shown in FIG. 5B, the first guide body 296A may be formed integrally with not an independent member but a first eccentric body 254B of which the movement in the axial direction is restricted. In this case, it may be possible to further reduce the number of components.

Meanwhile, in this example, both ends of the first and second rollers 255A and 255B are directly positioned by the first to fourth guide body 296A to 296D. If this structure is employed, the first and second retainers 294A and 294B are maintained in a non-contact state. Accordingly, it may be possible to further reduce the thermal loads on the first and second retainers 294A and 294B.

Further, as shown in FIG. 5C, the outer portions of the first and second roller 355A and 355B in the radial direction may be pressed by the first and second guide bodies 396A and 396B that are integrated with the first and second externally toothed gears 358A and 358B. That is, the first and second externally toothed gears 358A and 358B are interposed between the second reduction gear casing 342B and the positioning plate 373, so that the positions of the first and second externally toothed gears in the axial direction are restricted. For this reason, the first and second guide bodies 396A and 396B may integrally protrude from these first and second externally toothed gears 358A and 358B.

Furthermore, as shown in FIG. 5D, a part of an output member (an output flange 444 in an example shown in the drawing) may be modified and a first guide body 496A may be integrally formed. Alternatively, the reduction gear casing body 442B that is a part of the reduction gear casing may be modified and the second guide body 496B may be integrally formed.

In any case, the positioning members, which are disposed parallel to the ends of the first and second retainers 194A, 194B, 294A, 194B, 394A, 394B, 494A, or 494B in the axial direction, may be omitted (the positioning members may be disposed at positions that overlap the retainers in the axial direction). Accordingly, the axial length may be decreased by that much.

Meanwhile, since other portions of the examples of another embodiment shown in FIGS. 5A to 5D are basically the same as those of the first embodiment, the other portions may be denoted by reference numerals of which last two digits are the same in FIGS. 5A to 5D and the repeated description thereof will be omitted.

In the embodiment, the "tubular body" is formed of an eccentric body that is provided on the input shaft and has an (non-coaxial) outer periphery eccentric to the axis of the input shaft, and the externally toothed gear eccentrically oscillates, so that the externally toothed gear meshes with an inner portion of the internally toothed gear. However, the invention is not limited to this example. For example, the invention may also be applied to a so-called "flexible meshing type reduction gear" where a "tubular body" is formed of a cam body having an elliptical outer periphery (which is not coaxial with the axis of the input shaft) and an externally toothed gear meshes with an inner portion of an internally toothed gear by being deformed in the radial direction by the outer periphery of the cam body.

The invention may be effectively used for a device that particularly requires the reduction in the axial length of the reduction gear, such as a robot joint driving device.

It should be understood that the invention is not limited to the above-described embodiment, but may be modified into various forms on the basis of the spirit of the invention. Additionally, the modifications are included in the scope of the invention.

What is claimed is:

1. A reduction gear that includes an externally toothed gear and an internally toothed gear in a casing and makes the externally toothed gear mesh with an inner portion of the internally toothed gear by using a tubular body, the tubular body being provided on an input shaft and having an outer periphery that is not coaxial with an axis of the input shaft, the reduction gear comprising:
   a plurality of rollers that directly comes into rolling contact with the outer periphery of the tubular body;
   a retainer that maintains gaps between the plurality of rollers in a circumferential direction; and
   a guide body of which the movement is restricted in an axial direction and which restrict the movement of the rollers in the axial direction by coming into direct contact with ends of the rollers in the axial direction.

2. The reduction gear according to claim 1,
   wherein the guide body is interposed between two members in the casing, so that the movement of the guide body in the axial direction is restricted, and
   the guide body is formed of members that are rotatable relative to the two members.

3. The reduction gear according to claim 2,
   wherein the guide body is interposed between an end of the tubular body in the axial direction and a bearing supporting the input shaft, so that the movement of the guide bodies in the axial direction is restricted.

4. The reduction gear according to claim 1,
   wherein the guide body is formed integrally with members of which the movement in the axial direction is restricted in the casing.

5. The reduction gear according to claim 4,
   wherein the member of which the movement in the axial direction is restricted is any one of the casing, the externally toothed gear, the tubular body, an output member of the reduction gear, and a member rotating together with the output member.

* * * * *